United States Patent
Lee et al.

(10) Patent No.: US 8,634,959 B2
(45) Date of Patent: Jan. 21, 2014

(54) APPARATUS AND METHOD DETECTING A ROBOT SLIP

(75) Inventors: Hyoung-Ki Lee, Seongnam-si (KR); Ki-wan Choi, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 506 days.

(21) Appl. No.: 12/662,527

(22) Filed: Apr. 21, 2010

(65) Prior Publication Data

US 2011/0054686 A1 Mar. 3, 2011

(30) Foreign Application Priority Data

Aug. 25, 2009 (KR) ........................ 10-2009-0078830

(51) Int. Cl.
*G05B 19/04* (2006.01)

(52) U.S. Cl.
USPC ........... 700/253; 700/255; 700/258; 700/260; 700/261

(58) Field of Classification Search
USPC .......... 700/245, 250, 253, 255, 258, 260, 261
See application file for complete search history.

(56) References Cited

U.S. PATENT DOCUMENTS

| | | | | |
|---|---|---|---|---|
| 4,680,714 A | * | 7/1987 | Kubo | 701/79 |
| 4,829,219 A | * | 5/1989 | Penkar | 318/568.18 |
| 6,298,283 B1 | * | 10/2001 | Kato et al. | 700/255 |
| 7,162,056 B2 | * | 1/2007 | Burl et al. | 382/104 |
| 2005/0104549 A1 | * | 5/2005 | Nishimura et al. | 318/568.24 |
| 2007/0095585 A1 | * | 5/2007 | Imura et al. | 180/65.3 |
| 2007/0106423 A1 | * | 5/2007 | Myeong et al. | 700/245 |
| 2007/0273864 A1 | * | 11/2007 | Cho et al. | 356/28 |
| 2008/0091305 A1 | * | 4/2008 | Svendsen et al. | 700/258 |
| 2008/0133102 A1 | * | 6/2008 | Kubo | 701/84 |
| 2008/0140256 A1 | * | 6/2008 | Nishiyama | 700/255 |
| 2009/0005947 A1 | * | 1/2009 | Maeda | 701/88 |
| 2010/0037418 A1 | * | 2/2010 | Hussey et al. | 15/319 |
| 2010/0174409 A1 | * | 7/2010 | Park et al. | 700/259 |
| 2010/0312448 A1 | * | 12/2010 | Kueperkoch et al. | 701/82 |
| 2010/0324773 A1 | * | 12/2010 | Choi et al. | 701/26 |
| 2011/0085699 A1 | * | 4/2011 | Choi et al. | 382/103 |
| 2011/0268349 A1 | * | 11/2011 | Choi et al. | 382/153 |
| 2012/0219207 A1 | * | 8/2012 | Shin et al. | 382/153 |
| 2012/0232697 A1 | * | 9/2012 | Lee et al. | 700/259 |

FOREIGN PATENT DOCUMENTS

| | | |
|---|---|---|
| JP | 06-095733 | 4/1994 |
| JP | 2008-140144 | 6/2008 |
| KR | 10-2006-0052753 | 5/2006 |
| KR | 10-2008-0029080 | 4/2008 |
| KR | 10-2008-0094618 | 10/2008 |

\* cited by examiner

*Primary Examiner* — Khoi Tran
*Assistant Examiner* — Adam Mott
(74) *Attorney, Agent, or Firm* — Staas & Halsey LLP

(57) ABSTRACT

Disclosed is an apparatus and method for detecting slip of a robot. The robot periodically repeats a pattern movement in the order of a uniform motion, a decelerating motion, and an accelerating motion, or in the order of a uniform motion, an accelerating motion, and a deceleration motion. The occurrence of slip of the robot performing a pattern movement is determined by comparing a first acceleration of the robot measured by an acceleration sensor and a second acceleration of the robot measured by an encoder.

10 Claims, 8 Drawing Sheets

APPARATUS AND METHOD DETECTING A ROBOT SLIP

CROSS-REFERENCE TO RELATED APPLICATIONS

This application claims the benefit under 35 U.S.C. §119 (a) of Korean Patent Application No. 10-2009-0078830, filed on Aug. 25, 2009, the disclosure of which is incorporated by reference in its entirety for all purposes.

BACKGROUND

1. Field

One or more embodiments relate to a technology of detecting a slip of a mobile robot.

2. Description of the Related Art

The term "robot" is generally applied to an autonomous figure having a human form which is equipped with a machine to operate body parts including mechanical limbs to perform functions in a humanlike manner. However, nowadays, the term of 'robot' can refer to a machine that may not resemble human beings in appearance but may be able to autonomously perform tasks.

In particular, a mobile robot is desirable in performing tasks in harsh environments or dangerous areas replacing humans. In addition, a domestic mobile robot, such as a cleaning robot, which autonomously moves in homes is becoming increasingly common for helping housework.

In order for a mobile robot to autonomously move and perform tasks, localization for self position recognition is desirable. One representative form of localization is known as simultaneous localization and mapping (SLAM). SLAM refers to a method by which a robot detects information about surroundings and processes the obtained information, thereby estimating the absolute position thereof while building a map corresponding to a task space for task to be performed.

When the robot obtains the information about surrounding to perform the SLAM, if an unexpected slip occurs during motion of the robot, errors in obtaining information increase and inaccuracy of the position recognition is caused.

In particular, when a cleaning robot operates in homes of a complicated structure, the robot may slip while passing over a carpet or a door sill or may collide with an obstacle. The slip represents a state in which a driving wheel rotates but the robot stop moving. Thus it is desirable for the slip to be detected and for another path to be generated, thereby preventing the robot from becoming stuck.

SUMMARY

In one or more embodiments, there is provided an apparatus for detecting slip of a robot. The apparatus includes a pattern-movement command unit and a slip detection unit. The pattern-movement command unit generates a pattern-movement command controlling the robot to perform consecutive motions including at least two of a uniform motion, a decelerating motion, and an accelerating motion. The slip detection unit detects a slip of the robot operating according to the pattern-movement command by comparing a first acceleration measured by an acceleration sensor of the robot with a second acceleration measured by an encoder of the robot, the encoder measuring a different acceleration of the robot than the acceleration sensor.

The pattern-movement command unit receives the first acceleration measured by the acceleration sensor, calculates an acceleration in Z-axis perpendicular to a travelling direction of the robot based on the received first acceleration and generates a pattern movement command by use of the calculated acceleration in Z-axis.

The apparatus for detecting slip of a robot further includes an image analysis unit which obtains surrounding images of the robot and calculates the amount of change in the obtained images. If the calculated amount of change in the obtained images is determined to be equal to or less than a predetermined threshold value, the pattern movement command unit generates a pattern movement command.

If a difference between the first acceleration and the second acceleration is determined to be equal to or greater than, a first threshold value, the slip detection unit determines that a slip of the robot occurs. The pattern movement command unit calculates the difference between the first acceleration and the second acceleration. If a difference between the first acceleration and the second acceleration is determined to be equal to or greater than a second threshold value and less than the first threshold value, the pattern movement command is generated.

In one or more embodiments, there is provided a method of detecting a slip of a robot. The method is as follows. First, a pattern-movement command is generated. The pattern movement command controls the robot to perform consecutive motions including a uniform motion, a decelerating motion, and an accelerating motion. The consecutive motions are performed in the order of a uniform motion, a decelerating motion, and an acceleration motion or in the order of a uniform motion, an accelerating motion, and a decelerating motion. Then, a first acceleration of the robot operating according to the pattern-movement command is measured by use of an acceleration sensor. A second acceleration of the robot operating according to the pattern-movement command is measured by use of an encoder. The slip of the robot is detected by comparing the first acceleration with the second acceleration.

If an acceleration in a Z-axis, which is defined as an acceleration of a direction perpendicular to a travelling plane of the robot, is determined to be equal to or greater than a predetermined threshold value, the pattern-movement command may be generated.

If the amount of change in the obtained images is determined to be equal to and less than a threshold value, the pattern-movement command may be generated.

In addition, the pattern movement command may be generated based on the difference between the first acceleration and the second acceleration.

Other features will become apparent to those skilled in the art from the following detailed description, which, taken in conjunction with the attached drawings, discloses one or more embodiments of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
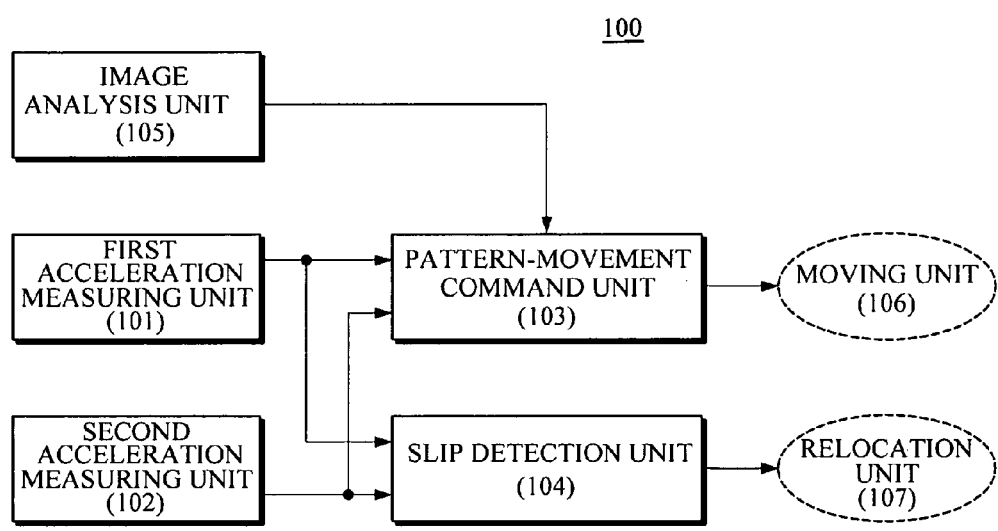
FIG. 1 illustrates an apparatus for detecting a slip of a robot, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an apparatus for detecting a slip of a robot, according to one or more embodiments.

As shown in FIG. 1, an apparatus 100 for detecting a slip of a robot includes a first acceleration measuring unit 101, a second acceleration measuring unit 102, a pattern-movement command unit 103, a slip detection unit 104, and an image analysis unit 105, for example.

The first acceleration measuring unit 101 may measure a first acceleration of a moving robot by use of an acceleration sensor. For example, the first acceleration measuring unit 101 may include an acceleration sensor and/or a gyro sensor. The first acceleration may, thus, be described hereafter as an acceleration of the robot measured by such an acceleration sensor and/or gyro sensor, noting that embodiments are not limited to the same.

The second acceleration measuring unit 102 may measure a second acceleration of the robot by use of an encoder, for example. The encoder may measure wheel rotations of the robot and calculate a displacement, a velocity, and an acceleration of the robot based on the measured wheel rotations. For example, the second acceleration measuring unit 102 may include an encoder. The second acceleration may, thus, be described hereafter as an acceleration of the robot measured by the encoder, again noting that embodiments are not limited to the same.

Figure 2:
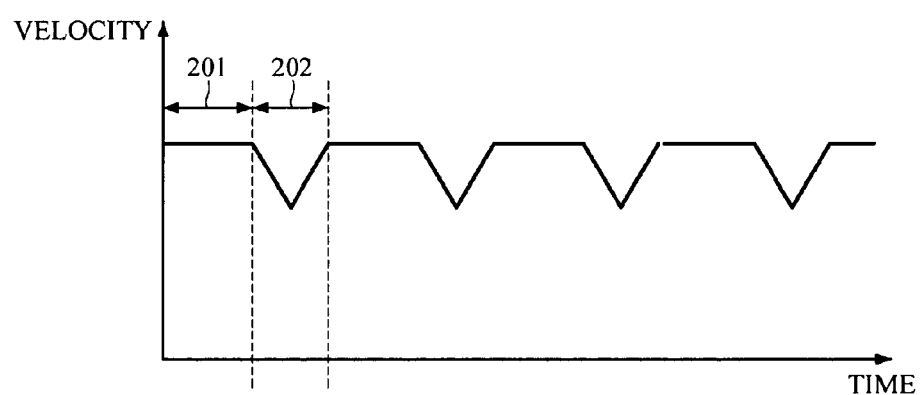
FIG. 2 illustrates a velocity of a robot corresponding to a pattern-movement command, according to one or more embodiments.

The pattern-movement command unit 103 may generate a pattern-movement command. The pattern-movement command may represent a control signal which allows a moving unit 106 of the robot to provide power required for acceleration/deceleration pattern movement. For example, a pattern-movement command may be a command controlling the robot to periodically repeat consecutive motions in the order of a uniform motion, a decelerating motion, and then an accelerating motion or in the order of a uniform motion, an accelerating motion, and then a decelerating motion, or an order of at least two of such motions. In this manner, in an embodiment, the robot may perform a uniform motion, an accelerating motion, and a decelerating motion according to the pattern-movement command. FIG. 2 illustrates the velocity of a robot corresponding to a pattern-movement command, according to one or more embodiments. The pattern-movement command may be a single command on initiating or continuing such a pattern of movements, or separate commands controlling each respective movement portion of the pattern, e.g., a command for a uniform movement, a command for an accelerating movement, and a command for a decelerating movement. Collectively, these commands will be considered to be represented by the term pattern-movement command.

Referring again to FIG. 1, the pattern-movement command may be transmitted to the moving unit 106, for example. The moving unit 106 may include wheels to move the robot and a driving motor to generate driving force for wheels, noting that embodiments are not limited to the same.

The slip detection unit 104 compares the first acceleration measured by the first acceleration measuring unit 101 with the second acceleration measured by the second acceleration unit 102 and detects the occurrence of a slip of the robot based on the result of comparison. For example, when the robot moves according to the pattern-movement command, the slip detection unit 104 calculates a difference between the first acceleration and the second acceleration. If the difference is equal to or greater than a first threshold value, the slip detection unit 104 may determine that a slip has occurred.

Hereinafter, the description below will be made in relation to the robot, moving according to a pattern-movement command, which may run idle due to a collision with an obstacle. In this case, since the robot may stop moving, the aforementioned first acceleration would be 0 and the second acceleration may continue to change. Accordingly, a slip state of the robot may be easily detected by comparing the first acceleration with the second acceleration.

In an embodiment, upon the detection of a slip of the robot, the slip detection unit 104 may apply a control command to a relocation unit 107 to change a path that the robot follows. For example, if the slip detection unit 104 notifies the relocation unit 107 of the occurrence of a slip, the relocation unit 107 may control the moving unit 106 such that the robot moves backward and then moves along a new path.

In an embodiment, the pattern-movement command unit 103 may unconditionally generate a pattern-movement command. In this case, the robot may keep performing a movement in the acceleration/deceleration pattern manner. However, the way the robot moves is not limited thereto. The pattern-movement command unit 103 may, for example, generate a pattern-movement command when a preset condition is satisfied. The preset condition may be when a signal is received indicating that a slip has possibly occurred, where in such a case the generating of the pattern-movement command, or maintenance of the same, may help confirm whether the slip has actually occurred.

For example, the pattern-movement command unit 103 may receive outputs of the first acceleration detection unit 101, the second acceleration detection unit 102, and the image analysis unit 105. The pattern-movement command unit 103 may thereby determine whether to generate a pattern-movement command based on the outputs of the first acceleration measuring unit 101, the second acceleration measuring unit 102, and the image analysis unit 105.

As an example, if a difference between the first acceleration and the second acceleration meets, e.g., is equal to or greater than, a second threshold value and does not meet, e.g., is less than, a first threshold value, the pattern-movement command unit 103 may generate a pattern-movement command. The first threshold value may serve as a reference used to determine the occurrence of a slip. The second threshold value may be smaller than the first threshold value. In other words, in an embodiment, the difference between the first acceleration and the second acceleration may be small, for example, if the difference is equal to or greater than the second threshold value and less than the first threshold value, the pattern-movement command unit 103 may determine that there is a chance that the robot has slipped and generate a pattern-movement command. If the difference between the first acceleration and the second acceleration is great (for example, equal to or greater than the first threshold value), even if the pattern-movement command unit 103 does not generate a pattern-movement command, the slip detection unit 104 may immediately detect that a slip has occurred, i.e., further confirmation of the slip may not be necessary.

As another example, upon detection of a vertical movement of the robot, the pattern-movement command unit 103 may generate a pattern-movement command. For example, when the robot passes over an obstacle such as a wire, the wheels of the robot may collide with the obstacle, causing a slip. The pattern-movement command unit 103 may detect a vertical movement of the robot based on a detected acceleration in the Z-axis which is defined as an acceleration in a direction perpendicular to a travelling direction of the robot in the first acceleration.

As another example, the pattern-movement command unit 103 may generate a pattern-movement command based on an image obtained from the image analysis unit 105. The image analysis unit 105 may include a camera for photographing the surroundings of the robot and an image processing device to process the obtained images. The image analysis unit 105 may calculate the amount of change between the images obtained when the robot moves. Here, in an embodiment, the change between images may be defined based on a change in position of features present in respective images. For example, the image analysis unit 105 may measure the amount of change between the images by use of the Lucas-Kanade tracker scheme. In such an embodiment, the pattern-movement command unit 103 may generate a pattern-movement command when the amount of change is equal to or less than a preset threshold value. For example, if a robot is stuck due to collision with an obstacle, it is expected that the amount of change between images is small and the robot has possibly slipped. In this case, the pattern-movement command unit 103 may generate a pattern-movement command. If the amount of change between images is equal to or less than the threshold value and rotations of the wheels are detected by the encoder, the slip detection unit 104 may determine that a slip occurs in the robot without needing to control the robot to perform further acceleration/deceleration pattern-movement.

As another example, if rotations between a main wheel and an auxiliary wheel are different from each other, a pattern-movement command may be generated. In this case, the main wheel may be caused to rotate based on a driving force and to move the robot, and the auxiliary wheel, e.g., followed by or following the main wheel, may rotate without receiving driving force. If it is determined that the difference between rotations of the main wheel and the auxiliary wheel is equal to or greater than a preset threshold value, it may be determined that a slip has possibility occurred, and as such a pattern-movement command is generated. In addition, in an embodiment, if it is determined that the difference between rotations of the main wheel and the auxiliary wheel continues over a predetermined period of time or for a predetermined distance, a pattern-movement command may also be generated. In the case that a robot stops moving due to a collision with an obstacle, the main wheels of the robot would rotate but the auxiliary wheels may stop moving, so the difference between rotations may be considerable. Such a pattern-movement command is generated based on the fact that the rotation difference represents the possibility that the robot slips. If the difference between rotations is substantially large or continues for a long period of time, the slip detection unit 104 may immediately determine that a slip has occurred without further acceleration comparisons, for example.

According to an apparatus for detecting a slip of a robot, if it is determined that a slip has possibly occurred in the robot, the robot may initiate a pattern-motion. If the robot performing the pattern-motion slips, the difference between the first acceleration and the second acceleration may be great, so that a slip of the robot is easily detected.

FIG. 2 illustrates a graph of the velocity of a robot over time according to a pattern-movement command, according to one or more embodiments.

As shown in FIG. 2, reference numeral 201 indicates a uniform velocity section and reference numeral 202 indicates an acceleration/deceleration section. Although the acceleration/deceleration section 202 is formed by sequentially reducing and increasing the speed of the robot, the form of the acceleration/deceleration section is not limited to the same, and alternative approaches for reducing and/or increasing speed of the robot may be implemented. As only an example, the acceleration/deceleration section may alternatively be formed by sequentially increasing and reducing the speed of the robot. As shown, in FIG. 2, the robot performs a uniform motion in section 201, and performs decelerating/accelerating motions in section 202.

Hereinafter, the principle of detecting a slip will be further described with reference to FIGS. 3 and 4.

Figure 3:
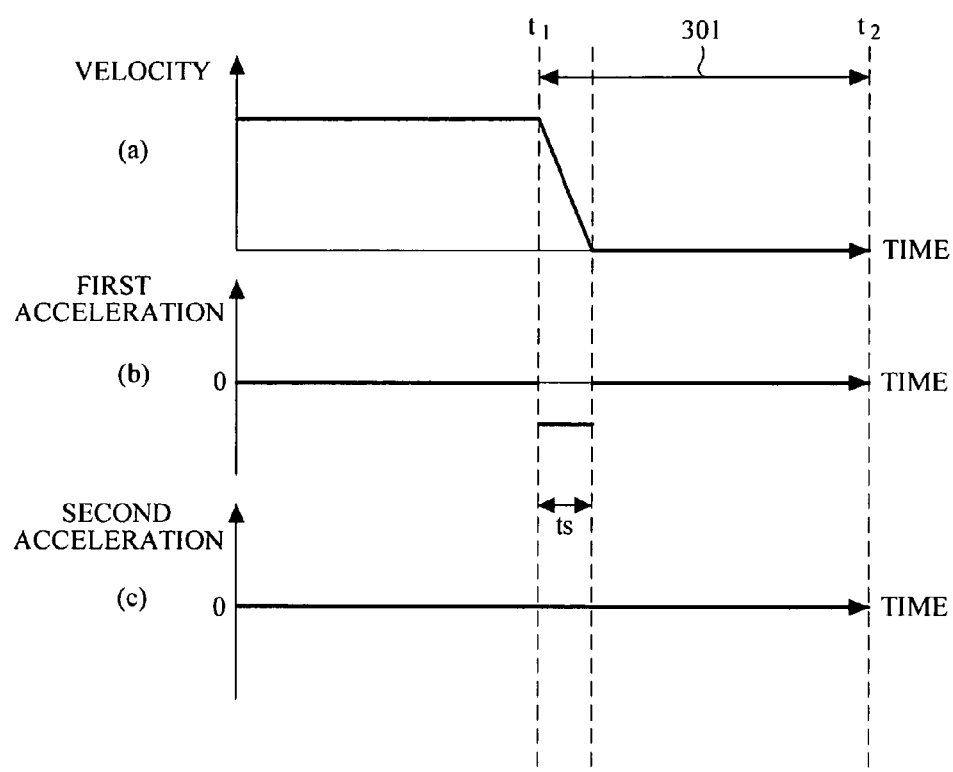
FIG. 3 illustrates a principle of detecting a slip, according to one or more embodiments.

FIG. 3 illustrates a robot which only performs a uniform motion, according to one or more embodiments.

In FIG. 3, the illustrated velocity (a) represents the velocity of a robot, first acceleration (b) represents a first acceleration of a robot measured by an acceleration sensor, and second acceleration (c) represents a second acceleration of a robot measured by an encoder. Reference numeral 301 represents a section at which a slip occurs.

As shown in velocity (a) of FIG. 3, the robot, which starts moving with a uniform motion, appears to have collided with an obstacle at a time t1. As a result, the velocity of the robot has been caused to decrease, and finally the robot stops moving after time ts.

As shown in first acceleration (b) of FIG. 3, the first acceleration of the robot is only produced during a point in which the robot stops moving due to the collision with the obstacle. That is, the first acceleration is produced during a short period of time between t1 and t2, and reflects 0 acceleration during the remainder of the time.

As shown in second acceleration (c) of FIG. 3, since the wheels of the robot keep operating at a uniform velocity despite the slip, the second acceleration of the robot remains at 0 over the entire time.

If the time during which the difference between the first acceleration and second acceleration is referred to as 'ts', the time taken until the robot stops moving due to the collision with an obstacle is very short. Accordingly, 'ts' has a very small value, so that it is difficult to detect a point during which a difference between the first and second accelerations is made and determine the occurrence of a slip.

Figure 4:
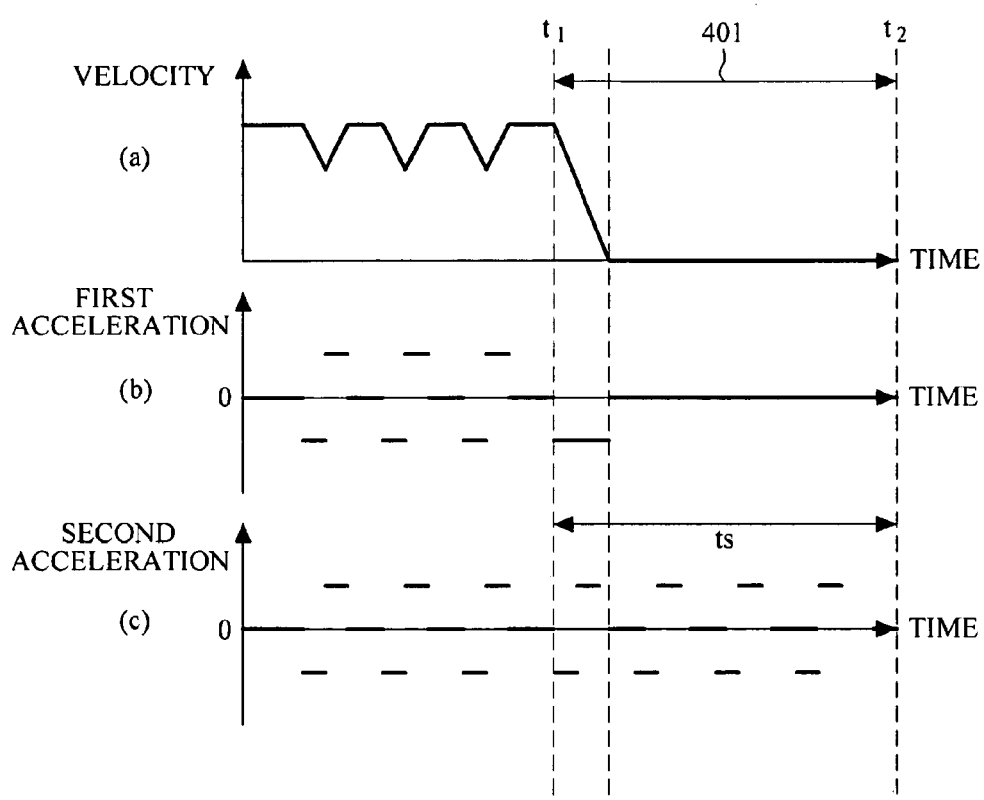
FIG. 4 illustrates a movement of a robot according to a pattern-movement manner, according to one or more embodiments.

FIG. 4 illustrates a movement of a robot in a pattern-movement manner, according to one or more embodiments.

In FIG. 4, velocity (a) represents the velocity of a robot, first acceleration (b) represents a first acceleration of a robot detected by an acceleration sensor, and second acceleration (c) shows a second acceleration of a robot measured by an encoder. Reference numeral 401 indicates the section in which a slip occurs.

As shown in velocity (a) of FIG. 4, the robot, which has started consecutive motions in the order of a uniform motion, a decelerating motion, and an accelerating motion, collides with an obstacle at time t1. That is, the robot, which has been performing the desired pattern-movement, stops moving.

As shown in first acceleration (b) of FIG. 4, before the time t1, the first acceleration of the robot varies depending on the motion type such as a uniform motion, an accelerating motion, and a decelerating motion. After the time t1, the robot stops moving, so that the first acceleration of the robot becomes 0, and remains at 0.

As shown in second acceleration (c) of FIG. 4, before the time t1, the wheels of the robot also operate according to the motion type such as the uniform motion, the decelerating motion, and the accelerating motion, so that the second acceleration of the robot may have the same values as the first acceleration. In addition, even after the time t1, the wheels of the robot may continue the desired motions including a uniform motion, a decelerating motion, and an accelerating motion. Accordingly, the second acceleration of the robot may continue to vary with time.

A determined difference between the first and second accelerations is made over the entire slip section corresponding to 'ts' from t1 to t2. Here, the time 'ts' shown in FIG. 4 is longer than the time 'ts' of FIG. 3. In addition, since a difference between the first and second accelerations is periodically made, even if the difference is not detected at the beginning of a slip, if the difference is repeatedly calculated over the slip section then it may be detected later. Accordingly, the detection of a slip is easily achieved.

Figure 5:
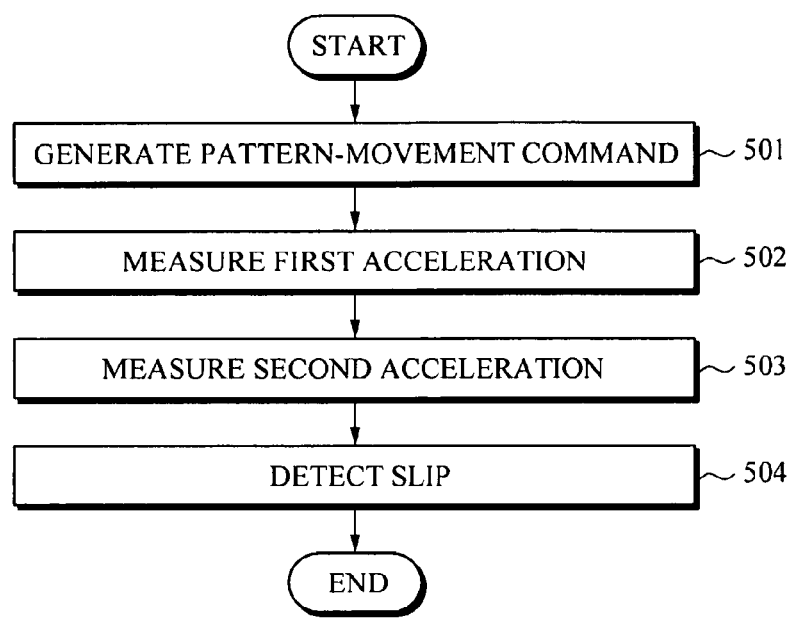
FIG. 5 illustrates a method of detecting a slip of a robot, according to one or more embodiments.

FIG. 5 illustrates a method of detecting a slip of a robot, according to one or more embodiments.

As shown in FIG. 5, a pattern-movement command may be generated (operation 501). In one or more embodiments, the pattern-movement command controls a robot to perform consecutive motions in the order of a uniform motion, an accelerating motion, and a decelerating motion, or in the order of a uniform motion, a decelerating motion, and an accelerating motion. For example, if a given condition is satisfied, the pattern-movement command unit generates a pattern-movement command and transmits the pattern-movement command to a moving unit. A condition instigating the generation of a pattern-movement command will be described in greater detail below.

While the robot is performing a pattern-movement according to the pattern-movement command, the first acceleration of the robot may be measured (operation 502). In an embodiment, the first acceleration of the robot is measured through an acceleration sensor. For example, the first acceleration of the robot may be measured through a first acceleration measuring unit including an inertial sensor and a gyro sensor.

After that, for example, the second acceleration of the robot may be measured (operation 503). In an embodiment, the second acceleration of the robot may be measured through an encoder. For example, the second acceleration of the robot may be measured by the second acceleration measuring unit 102 including an encoder, which calculates an acceleration by detecting the rotation of one or more wheels of the robot.

The first acceleration may then be compared with the second acceleration (operation 504), thereby determining the occurrence of a slip. For example, the slip detection unit may calculate the difference between the first acceleration and the second acceleration. In an embodiment, if the difference between the first and second accelerations is equal to or greater than a first threshold value, the slip detection unit determines that a slip has occurred regarding the robot.

Figure 6:
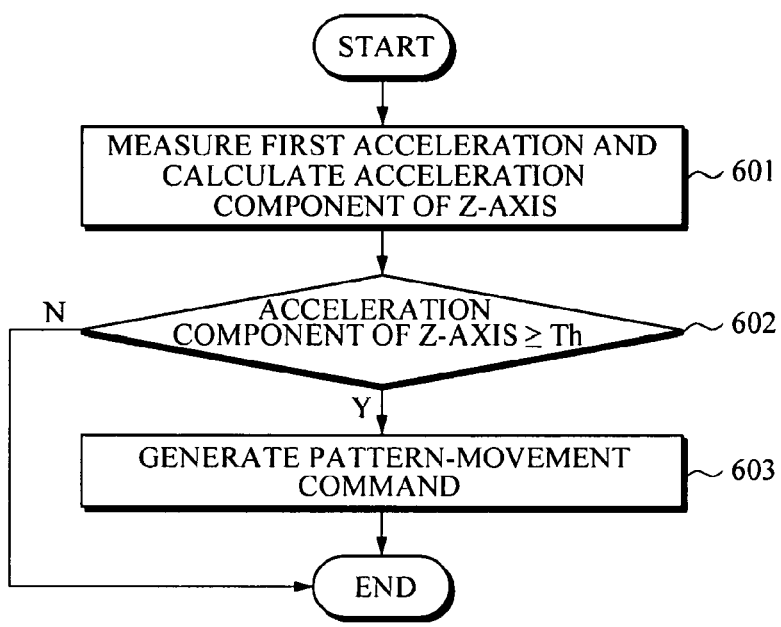
FIG. 6 illustrates a method of generating a pattern-movement command, according to one or more embodiments.

FIG. 6 illustrates a method of generating a pattern-movement command, according to one or more embodiments.

As shown in FIG. 6, the first acceleration of the robot is measured (operation 601), and an acceleration, e.g., which corresponds to a direction perpendicular to a travelling direction of the robot in the first acceleration, is calculated. The first acceleration may represent an acceleration measured through an acceleration sensor. For example, in an embodiment, the first acceleration of the robot may be measured by the first acceleration measuring unit including an inertial sensor and a gyro sensor. Then, here, the pattern-movement command unit calculates an acceleration in a Z-axis, which is included in the first acceleration and is defined as a direction perpendicular to a traveling direction of the robot.

After that, in an embodiment, it may be determined whether the acceleration in a Z-axis is equal to or greater than a preset threshold value (operation 602).

Based on the result of determination, if the acceleration in a Z-axis is equal to or greater than a preset threshold value, a pattern-movement command may be generated (operation 603).

In FIG. 6, if the acceleration in Z-axis is equal to or greater than the preset threshold value, the robot is regarded as moving upward. Such an upward movement of the robot is made when the robot passes over an obstacle, and it is anticipated that a slip may occur regarding the robot. In this case, a pattern-movement command may be generated.

Figure 7:
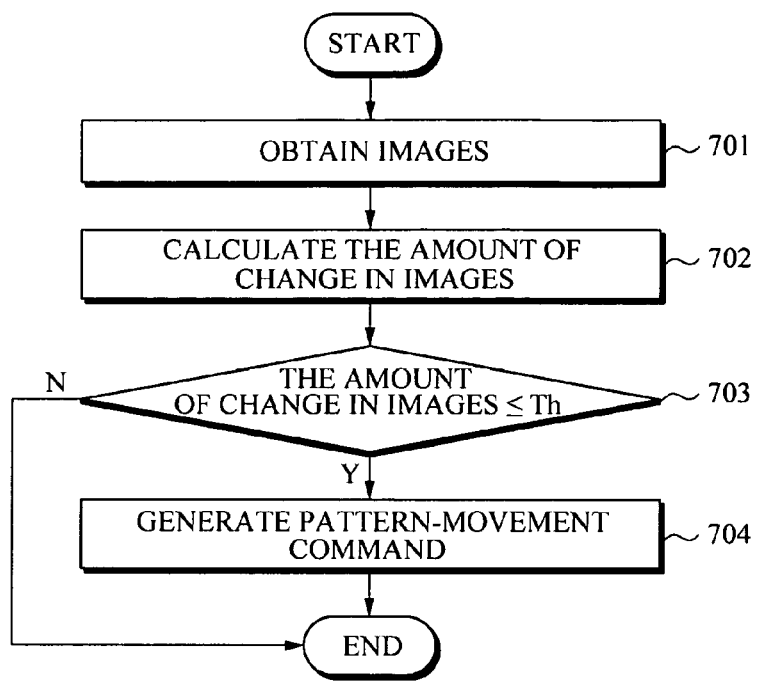
FIG. 7 illustrates a method of generating a pattern-movement command, according to one or more embodiments.

FIG. 7 illustrates a method of generating a pattern-movement command, according to one or more embodiments.

As shown in FIG. 7, surrounding images of the robot may be obtained (operation 701). For example, in an embodiment, the image analysis unit may obtain a plurality of images by use of a camera.

After that, the amount of change between images may be calculated (operation 702). For example, in an embodiment, the image analysis unit 105 may calculate the amount of change between images by use of the Lucas-Kanade tracker scheme.

Then, here, it is determined whether the amount of change between images is equal to or less than a preset threshold value (operation 703).

Based on the result of determination, if the amount of change is equal to or less than the preset threshold value, a pattern-movement command may be generated (operation 704).

Figure 8:
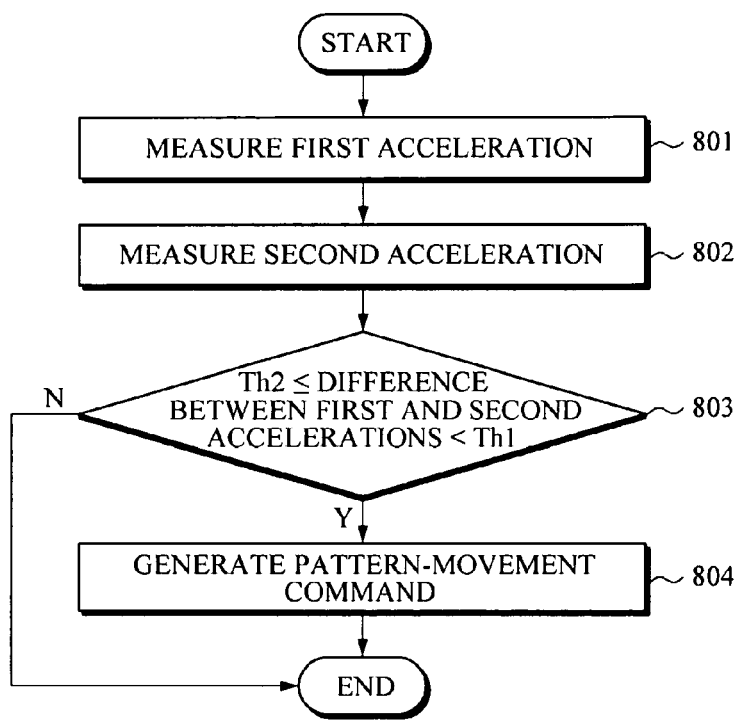
FIG. 8 illustrates a method of generating a pattern-movement command, according to one or more embodiments.

FIG. 8 illustrates a method of generating a pattern-movement command, according to one or more embodiments.

As shown in FIG. 8, the first acceleration of the robot may be measured (operation 801). The first acceleration of the robot may represent an acceleration measured through an acceleration sensor. For example, the first acceleration of the robot may be measured by the first acceleration measuring unit including an inertial sensor and a gyro sensor.

After that, the second acceleration of the robot may be measured (operation 802). In an embodiment, the second acceleration of the robot may represent an acceleration measured by an encoder. For example, the second acceleration may be measured by a second acceleration measuring unit including an encoder, which calculates an acceleration by detecting rotation of one or more wheels of the robot.

Then, it may be determined whether the difference between the first acceleration and the second acceleration is equal to or greater than a preset threshold value (operation 803). The preset threshold value may be set to be much smaller than the threshold value used in operation 504 of FIG. 5. For example, when the threshold value used in operation 504 of FIG. 5 is referred to as a first threshold value, and the threshold value used in operation 803 of FIG. 8 is referred to as a second threshold value, if the difference between the first acceleration and the second acceleration is equal to or greater than the first threshold value, the robot is determined to be in a slipping state. If the difference between the first acceleration and the second acceleration is equal to or greater than the second threshold value and less than the first threshold value, the robot is determined to possibly be in a slipping state. Accordingly, similar to operation 804, a pattern-movement command may also be generated.

One or more embodiments may include computer readable code on a computer readable recording medium, the computer readable code to control at least one processing device, such as a computer or processor, to implement one or more of the aforementioned embodiments, for example. The computer readable recording medium is any data storage device that can store data which can be thereafter read by a computer system, for example.

Examples of the computer readable recording medium include read-only memory (ROM), random-access memory (RAM), CD-ROMs, magnetic tapes, floppy disks, and optical data storage devices. The computer readable recording medium can also be a distributed network coupled computer system so that the computer readable code is stored and executed in a distributed fashion.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Thus, while aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus, including one or more processing devices, for detecting a slip of a robot, the apparatus comprising:
    a pattern-movement command unit to generate, using the one or more processing devices, a pattern-movement command controlling the robot to perform consecutive motions including at least two of a uniform motion, a decelerating motion, and an accelerating motion; and
    a slip detection unit to detect a slip of the robot operating according to the pattern-movement command by comparing a first acceleration measured by an acceleration sensor of the robot with a second acceleration measured by an encoder of the robot, the encoder measuring rotation of driving wheels of the robot,
    wherein, based upon a determination that a difference between the first acceleration and the second acceleration is equal to or greater than a first threshold value, the slip detection unit determines that a slip of the robot, operating according to the pattern-movement command, has occurred, wherein the first threshold is greater than zero.

2. The apparatus of claim 1, wherein the consecutive motions are performed in the order of a uniform motion, a decelerating motion, and an accelerating motion or in the order of a uniform motion, an accelerating motion, and a decelerating motion.

3. The apparatus of claim 1, wherein the pattern-movement command unit outputs the pattern-movement command based on a calculated acceleration in a direction perpendicular to a travelling plane of the robot.

4. The apparatus of claim 1, further comprising an image analysis unit to obtain surrounding images of the robot and calculate an amount of change between the obtained images,
    wherein the pattern-movement command unit generates the pattern-movement command based on the calculated amount of change between the images.

5. The apparatus of claim 1, wherein, based upon a determination that a difference between the first acceleration and the second acceleration is equal to or greater than a second threshold value and is less than the first threshold value, the pattern-movement command unit generates the pattern-movement command.

6. A method of detecting a slip of a robot, the method comprising:
    generating, using one or more processing devices, a pattern-movement command controlling the robot to perform consecutive motions including at least two of a uniform motion, a decelerating motion, and an accelerating motion;
    measuring a first acceleration of the robot operating according to the pattern-movement command by use of an acceleration sensor;
    measuring a second acceleration of the robot operating according to the pattern-movement command by use of an encoder, the encoder measuring rotation driving wheels of the robot; and
    detecting the slip of the robot by comparing the first acceleration with the second acceleration,
    wherein the slip of the robot is detected based upon a determination that a difference between the first acceleration and the second acceleration is equal to or greater than a threshold value, the threshold being greater than zero.

7. The method of claim 6, wherein the consecutive motions are performed in the order of a uniform motion, a decelerating motion, and an accelerating motion or in the order of a uniform motion, an accelerating motion, and a decelerating motion.

8. The method of claim 6, further comprising calculating an acceleration in a Z-axis, which is defined as an acceleration of a direction perpendicular to a travelling plane of the robot,
    wherein, based upon a determination that the calculated acceleration in the Z-axis is equal to or greater than a threshold value, the pattern-movement command is generated.

9. The method of claim 6, further comprising obtaining surrounding images of the robot and calculating an amount of change between the obtained images,
    wherein, based upon a determination that the amount of change between the images is equal to or less than a threshold value, the pattern-movement command is generated.

10. The method of claim 6, wherein, based upon a determination that a difference between the first acceleration and the second acceleration is equal to or greater than a threshold value, the pattern-movement command is generated.

* * * * *